United States Patent
Gardner et al.

(10) Patent No.: US 10,677,494 B2
(45) Date of Patent: Jun. 9, 2020

(54) LEAK DETECTION SYSTEM FOR WATER HEATERS

(71) Applicant: Rheem Manufacturing Company, Atlanta, GA (US)

(72) Inventors: Joseph D. Gardner, Montgomery, AL (US); Michael C. Mitchell, Auburn, AL (US); Timothy D. Scott, Tallassee, AL (US); William Jason Hall, Prattville, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 181 days.

(21) Appl. No.: 15/851,307

(22) Filed: Dec. 21, 2017

(65) Prior Publication Data
US 2019/0195533 A1  Jun. 27, 2019

(51) Int. Cl.
  *F24H 9/20* (2006.01)
  *G01M 3/40* (2006.01)
  *F24H 9/00* (2006.01)
  *F24H 9/16* (2006.01)
  *F24H 1/20* (2006.01)

(52) U.S. Cl.
  CPC .......... *F24H 9/2007* (2013.01); *F24H 9/001* (2013.01); *F24H 9/165* (2013.01); *F24H 9/2021* (2013.01); *G01M 3/40* (2013.01); *F24H 1/202* (2013.01)

(58) Field of Classification Search
  CPC .................................................... F24H 9/2007
  See application file for complete search history.

(56) References Cited

U.S. PATENT DOCUMENTS

| | | | | |
|---|---|---|---|---|
| 3,920,031 A * | 11/1975 | Maxfield | ................... | F17D 5/02 137/67 |
| 4,805,662 A * | 2/1989 | Moody | ................. | F24H 9/2021 122/14.3 |
| 5,029,605 A * | 7/1991 | Dowling | ................. | F24H 9/126 122/14.3 |
| 5,877,689 A * | 3/1999 | D'Amico | ................ | F24H 9/165 137/312 |
| 6,276,309 B1 * | 8/2001 | Zeek | ....................... | F24H 9/165 122/504 |
| 6,885,816 B1 * | 4/2005 | Hicks | ...................... | F24H 1/182 122/19.2 |
| 7,114,514 B2 * | 10/2006 | Houle | ................... | F24H 9/0005 137/312 |
| 8,443,823 B1 * | 5/2013 | Prager | ..................... | F16K 17/40 137/312 |
| 2004/0161227 A1 * | 8/2004 | Baxter | .................. | F24H 9/2021 392/454 |

* cited by examiner

*Primary Examiner* — Nathaniel Herzfeld
(74) *Attorney, Agent, or Firm* — Troutman Sanders LLP (57) ABSTRACT

A water heater with a leak detection system includes a leak sensor assembly that is disposed in an insulation cavity between an inner storage tank and an outer protective jacket of the water heater. The leak sensor assembly is configured to detect water that leaks from the storage tank. Further, the water heater includes a barrier that is disposed in the insulation cavity and wrapped around the inner storage tank to channel the water that leaks from the storage tank towards the leak sensor assembly, and prevent the water that leaks from the storage tank from flowing through an insulation material that is disposed in the insulation cavity.

17 Claims, 8 Drawing Sheets

LEAK DETECTION SYSTEM FOR WATER HEATERS

TECHNICAL FIELD

The present disclosure relates generally to water heaters, and more particularly to a leak detection system for water heaters.

BACKGROUND

A water heater may be subject to deterioration over the course of its life. Such deterioration may compromise the integrity of the water heater and may cause water that is stored in a storage tank of the water heater to leak. For example, the water may leak from the storage tank and eventually pool at the base of the water heater. If left undetected and unattended, such leaks may result in damage to furniture, electrical equipment, the water heater itself, and/or other property, which in turn may result in costly repairs. Further, these leaks can create a hazardous working environment for persons in the vicinity of the leak. Therefore, it is vital to detect the leak as early as possible and to determine how fast the water is leaking, i.e., the rate of the leak, to take necessary actions for preventing damages.

Conventional leak detection systems may not be configured to detect leaks early. Further, conventional leak detection systems may not be configured to distinguish between condensation that occurs during normal operation and a leak, thereby causing false positive detections and triggering false alarms. Furthermore, conventional leak detection systems may not be configured to determine a rate of the leak. In light of the above mentioned shortcomings of conventional leak detection systems of existing water heaters, the present disclosure provides improved leak detection systems for water heaters. This background information is provided to reveal information believed to be of possible relevance to the present disclosure. No admission is necessarily intended, nor should be construed, that any of the preceding information constitutes prior art against the present disclosure.

SUMMARY

In one aspect, the present disclosure relates to a water heater. The water heater includes an inner storage tank that is configured to store liquid that is to be heated. Further, the water heater includes an outer jacket that is disposed around and spaced apart from the inner storage tank such that the outer jacket and the inner storage tank define an annular insulation space therebetween. Furthermore, the water heater includes a leak sensor assembly that is disposed in the annular insulation space to detect the liquid that leaks from the inner storage tank. Additionally, the water heater includes a barrier that is disposed in the annular insulation space to prevent the liquid that leaks from the inner storage tank from flowing through an insulation material that is disposed in the annular insulation space and such that an interface between the barrier and the inner storage tank forms a channel that directs the liquid that leaks from the inner storage tank towards the leak sensor assembly.

In another aspect, the present disclosure relates to a water heater. The water heater includes an inner storage tank that is configured to store water that is to be heated, and an outer jacket that is disposed around and spaced apart from the inner storage tank such that the outer jacket and the inner storage tank define an insulation space therebetween. Further, the water heater includes a leak sensor assembly that is disposed in the insulation space to detect water that leaks from the inner storage tank. The leak sensor assembly includes a leak sensor, and a wicking tube that is formed of a wicking material and configured to transport the water towards the leak sensor. The wicking tube is helically wrapped around the storage tank and coupled to the leak sensor. Further, the wicking tube and leak sensor operate in concert to form a circumferential area of leak detection around the storage tank.

In yet another aspect, the present disclosure relates to a water heater. The water heater includes an inner storage tank that is configured to store liquid that is to be heated, and an outer jacket that is disposed around and spaced apart from the inner storage tank such that the outer jacket and the inner storage tank define an insulation space therebetween. Further, the water heater includes a leak sensor assembly that is disposed in the insulation space to detect the liquid that leaks from the inner storage tank. The leak sensor assembly comprises a plurality of leak sensors that are disposed on the storage tank. The plurality of leak sensors operate in concert to form a circumferential area of leak detection around the storage tank. Furthermore, the water heater includes a barrier that is disposed in the annular insulation space to direct the liquid that leaks from the storage tank towards the leak sensor assembly while preventing the water from flowing through an insulation material that is disposed in the annular insulation space.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

In the foregoing figures showing example embodiments of water heaters with the leak detection system, one or more of the components shown may be omitted, repeated, and/or substituted. Accordingly, the example embodiments of water heaters should not be considered limited to the specific arrangements of components shown in any of the figures. For example, features shown in one or more figures or described with respect to one embodiment can be applied to another embodiment associated with a different figure or description.

DETAILED DESCRIPTION OF EXAMPLE EMBODIMENTS

The present disclosure describes a water heater with a leak detection system that includes a leak sensor assembly that is disposed in an insulation cavity between an inner storage tank and an outer protective jacket of the water heater, where the leak sensor assembly is configured to detect water that leaks from the storage tank. Further, the water heater includes a barrier that is disposed in the insulation cavity and wrapped around the inner storage tank to: (a) channel the water that leaks from the storage tank towards the leak sensor assembly, and (b) prevent the water from flowing through an insulation material, e.g., foam, that is disposed in the insulation cavity.

Example embodiments of the water heater with the leak detection system will be described more fully hereinafter with reference to the accompanying drawings that describe representative embodiments of the present technology. If a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

The technology of the water heater with the leak detection system may be embodied in many different forms and should not be construed as being limited to the embodiments set forth herein; rather, these embodiments are provided so that this disclosure will be thorough and complete, and will fully convey the scope of the technology to those appropriately skilled in the art. Further, example embodiments of the present disclosure can be used for any size (e.g., capacity) of water heater. Furthermore, example embodiments of the present disclosure can be located in any type of environment (e.g., warehouse, attic, garage, storage, mechanical room, basement) for any type (e.g., commercial, residential, industrial) of user. Water heaters used with example embodiments can include both electric and/or fuel fired water heaters that can be used for one or more of any number of processes (e.g., automatic clothes washers, automatic dishwashers, showers, sink faucets, heating systems, humidifiers).

Water heaters (or components thereof, including controllers) described herein can be made of one or more of a number of suitable materials to allow that device and/or other associated components of a system to meet certain standards and/or regulations while also maintaining durability in light of the one or more conditions under which the devices and/or other associated components of the system can be exposed. Examples of such materials can include, but are not limited to, aluminum, stainless steel, copper, fiberglass, glass, plastic, PVC, ceramic, and rubber.

Further, components of a water heater (or portions thereof) described herein can be made from a single piece (as from a mold, injection mold, die cast, or extrusion process). In addition, or in the alternative, components of a water heater (or portions thereof) can be made from multiple pieces that are mechanically coupled to each other. In such a case, the multiple pieces can be mechanically coupled to each other using one or more of a number of coupling methods, including but not limited to epoxy, welding, soldering, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Terms such as "first", "second", "third", "top", "bottom", "side", and "within" are used merely to distinguish one component (or part of a component or state of a component) from another. Such terms are not meant to denote a preference or a particular orientation, and are not meant to limit embodiments of water heaters with leak detection systems. In the following detailed description of the example embodiments, numerous specific details are set forth in order to provide a more thorough understanding of the present disclosure. However, it will be apparent to one of ordinary skill in the art that the leak detection systems of the present disclosure may be practiced without these specific details. In other instances, well-known features have not been described in detail to avoid unnecessarily complicating the description.

Turning now to the figures, example embodiments of a water heater with the leak detection system will be described in connection with FIGS. 1-9. In particular, the different leak sensor assemblies will be described in connection with FIGS. 1-5; the barrier will be described in connection with FIGS. 6-8; and an example operation of a controller of the water heater in response to signals from the leak sensor assembly will be described in connection with FIG. 9.

Figure 1:
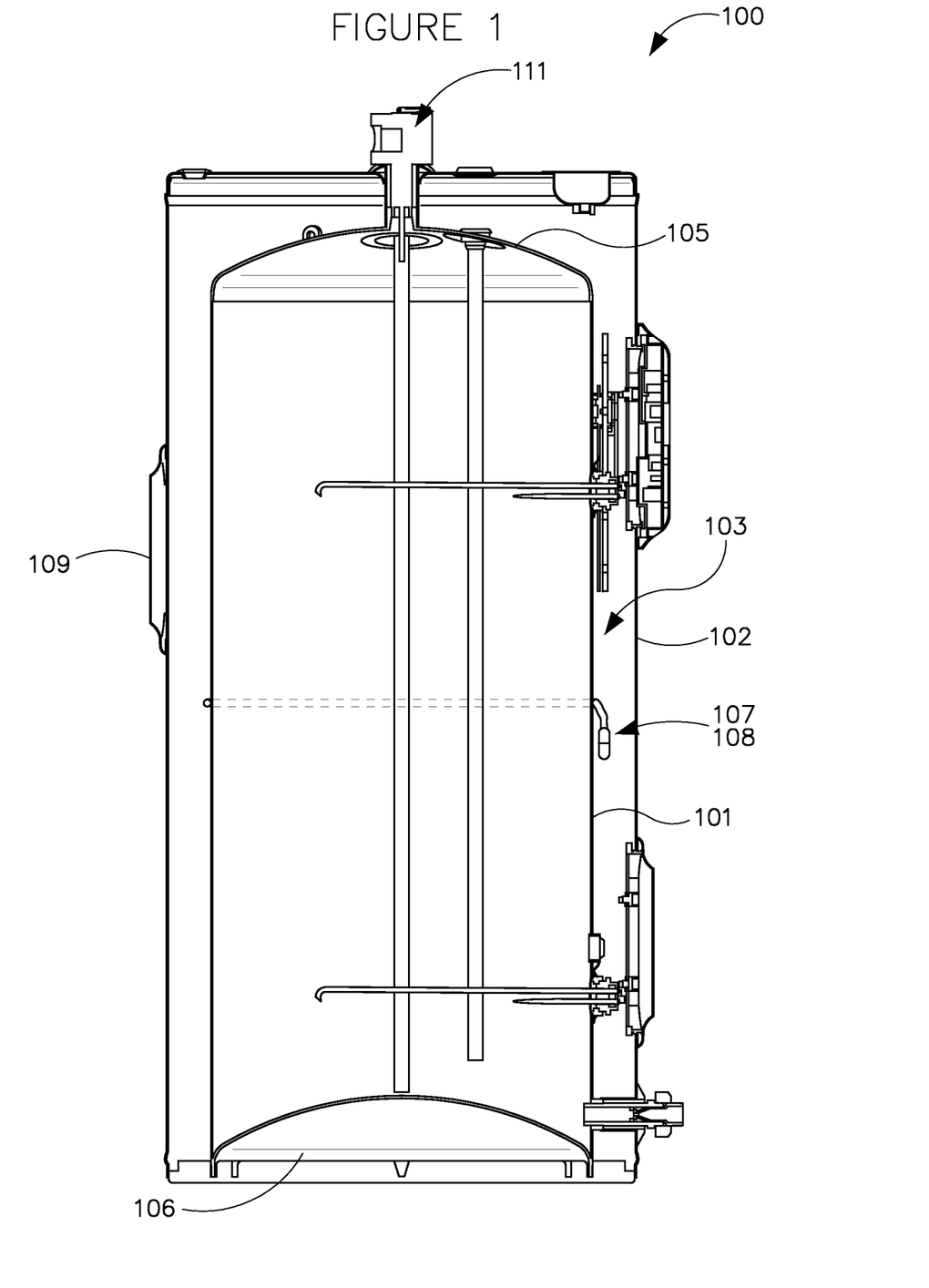
FIG. 1 illustrates a cross-section view of a water heater with a first example leak sensor assembly disposed in the insulation cavity of the water heater, in accordance with example embodiments of the present disclosure.
Figure 2:
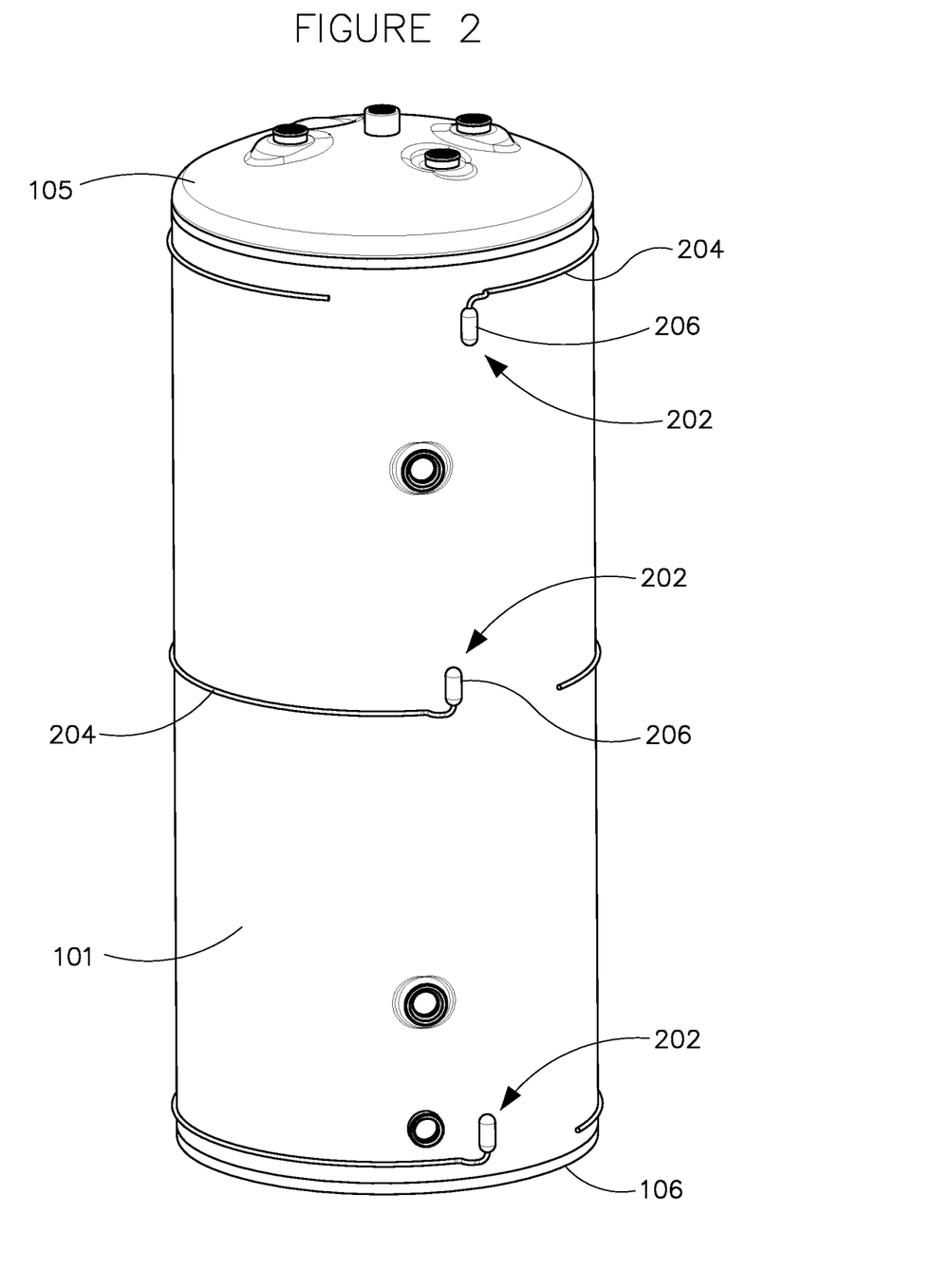
FIG. 2 illustrates a perspective view of an inner storage tank of the water heater with the first example leak sensor disposed thereon, in accordance with example embodiments of the present disclosure.

Turning to FIGS. 1 and 2, an example water heater 100 may include an inner storage tank 101 (hereinafter 'storage tank 101') that is substantially cylindrical in shape and is configured to store water that is to be heated by the water heater 100. Further, the water heater 100 may include an outer protective jacket 102 (hereinafter 'outer jacket 102') that is substantially cylindrical in shape and is disposed around the storage tank 101. In particular, the outer jacket 102 is larger is diameter than the inner storage tank 101 and is spaced apart from the storage tank 101 such that an annular insulation cavity 103 is formed in between the storage tank 101 and the outer jacket 102. The insulation cavity 103 may be external to the storage tank 101 and internal to the outer jacket 102, and may have a substantially cylindrical profile extending from a top end 105 to a bottom end 106 of the storage tank 101.

One of ordinary skill in the art can understand and appreciate that in addition to the components described above, the water heater 100 may include many other additional components such as, thermostats, heating elements, dip tubes, plumbing, drain pipes, bottom pans, burners, etc. However, said additional components are not described herein to avoid obscuring the features of the leak detection system of the water heater. Further, even though the present disclosure describes a storage tank, the outer jacket, and the insulation cavity formed therebetween as having a substantially cylindrical profile, one of ordinary skill in the art can understand and appreciate that in other example embodiments, the storage tank, the outer jacket, and the insulation cavity can have any other appropriate geometric or non-geometric shape without departing from a broader scope of the present disclosure.

Referring back to FIGS. 1 and 2, in addition to the storage tank 101 and the outer jacket 102, the water heater 100 may include a leak detection system 107 that is configured to detect water (or any appropriate liquid) that leaks from the storage tank 101 of the water heater 100. The leak detection system 107 may include a leak sensor assembly 108 that is disposed in the insulation cavity 103 of the water heater 100. In one example embodiment, as illustrated in FIGS. 1 and 2, the leak sensor assembly 108 may include multiple leak sensors 202 that are disposed on the external surface of the storage tank 101 or on a surface that is in contact with the storage tank 101. The leak sensor 202 may be a rope sensor that includes: (a) sensing segment 204 comprising metal sensing wires protected by a fiber material disposed around the sensing wires, and (b) a connector 206 (e.g., male or female connector) that is coupled to the sensing wires 204 and is disposed at one end of the rope sensor. However, in other example embodiments, the leak detection system may include any other appropriate sensor that is configured to detect any appropriate liquid that leaks from the storage tank 101.

As illustrated in FIG. 2, the leak sensor assembly may include three leak sensors 202 where a first leak sensor 202 is disposed on the storage tank 101 proximate to a top end 105 of the storage tank 101, a second leak sensor 202 is disposed on the storage tank 101 proximate to a bottom end 106 of the storage tank 101, and a third leak sensor 202 is disposed in between the top end 105 and the bottom end 106 of the storage tank 101. In other words, the multiple leak sensors 202 that are disposed on the storage tank 101 may be vertically separated from each other along the height of the storage tank 101. As illustrated in FIG. 2, when the leak sensor 202 is a rope sensor, each leak sensor 202 may be attached to the storage tank 101 using appropriate fasteners or adhesives such that the sensing segment 204 circumferentially extends around the storage tank 101 to create a circumferential area of leak detection around the storage tank 101. The circumferential area of leak detection allows leaks from any location around the storage tank 101 to be detected. In some examples where the leak sensors 202 are not rope sensors, the multiple leak sensors 202 may be disposed on the storage tank 101 such that they are angularly or horizontally separated from each other along with being vertically separated to create a circumferential area of leak detection around the storage tank 101. For example, the leak sensors may be disposed X degrees apart from each other along with the vertical separation from each other.

Figure 3:
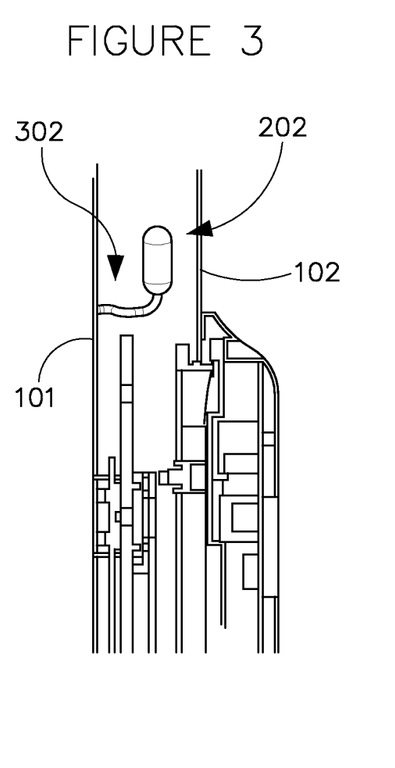
FIG. 3 illustrates a cross-section view of the water heater with a second example leak sensor assembly disposed in the insulation cavity and away from the inner storage tank of the water heater, in accordance with example embodiments of the present disclosure.
Figure 4:
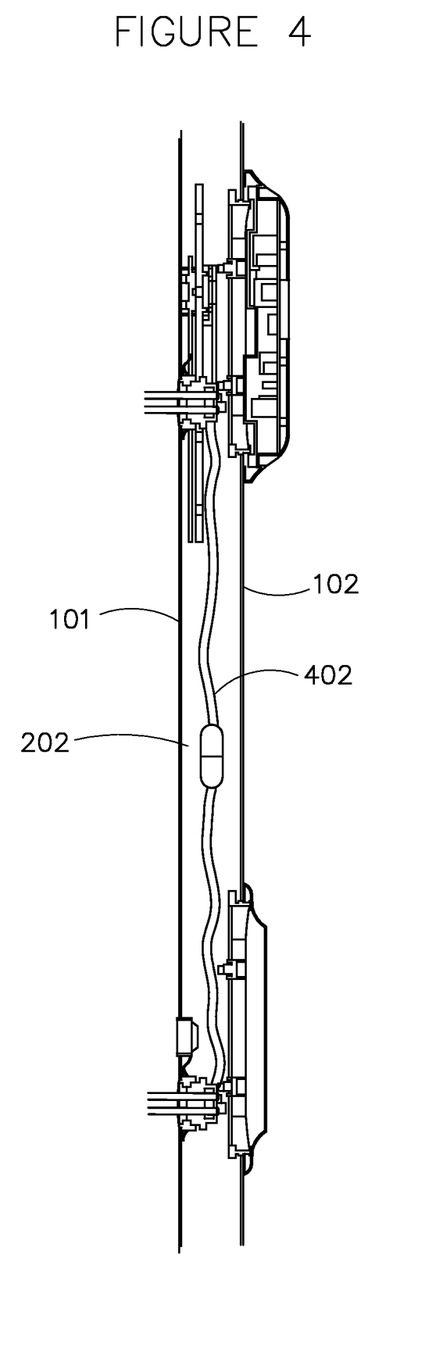
FIG. 4 illustrates a cross-section view of the water heater with a third example leak sensor assembly disposed in the insulation cavity and away from the inner storage tank of the water heater, in accordance with example embodiments of the present disclosure.

Even though the example embodiments disclosed above in association with FIGS. 1 and 2 describe a leak sensor assembly 108 that includes multiple leak sensors 202, e.g., three leak sensors 202, that are disposed on the surface of the storage tank 101 or on a surface that is in contact with the storage tank 101, one or ordinary skill in the art can understand and appreciate that in other example embodiments, the leak sensor assembly 108 may include fewer or more leak sensors 202 without departing from a broader scope of the present disclosure. Further, in some example embodiments, as illustrated in FIGS. 3-4, the leak sensors 202 may be disposed away from the surface of the storage tank 101 while still being in the insulation cavity 103 for an indirect method of leak detection.

The above described example having multiple leak sensors 202 disposed on and around the storage tank 101 of the water heater 100 allows a controller 109 of the water heater 100 to: (a) detect a rate of the leak, i.e., how fast the water is leaking from the storage tank 101, and (b) distinguish between water on the storage tank 101 due to condensation as contrasted with water due to a leak condition. For example, if the leak sensor that is disposed adjacent the bottom end 106 of the storage tank 101 detects water, but none of the other leak sensors detect water, including a leak sensor that may be disposed in the bottom pan and/or drain pan of the water heater, then, a circuit and/or coded instructions within the water heater controller 109 (hereinafter 'controller 109') may determine that the detected water is due to condensation.

In another example, if water is detected by the leak sensor 202 that is disposed adjacent to the top end 105 of the storage tank 101 and subsequently water is detected by the other leak sensors 202 disposed adjacent a mid-portion and the bottom end 106 of the storage tank 101, then, the controller logic may use the time difference between the detection of water by the different leak sensors 202 along with the volume of water that collects in the bottom pan or drain pan of the water heater 100 to determine the rate of the leak.

Further, the placement of the leak sensor assembly 108 in the insulation cavity 103 between the storage tank 101 and the outer jacket 102 allows for very early detection of the leak even before it reaches the bottom pan or drain pan of the water heater 100, which in turn provides ample time to take appropriate action to avoid any costly damages. Furthermore, the placement of leak sensor assembly 108 in the insulation cavity 103 between the storage tank 101 and the outer jacket 102 allows detection of a precise location of the leak from the storage tank 101, especially when multiple leak sensors are used as described above in association with FIGS. 1 and 2. Determining the precise location of the leak aids in quick and efficient troubleshooting and maintenance. An operation of the controller 109 upon detection of a leak from the storage tank 101 of the water heater 100 is discussed below in further detail in association with FIG. 9.

Figure 9:
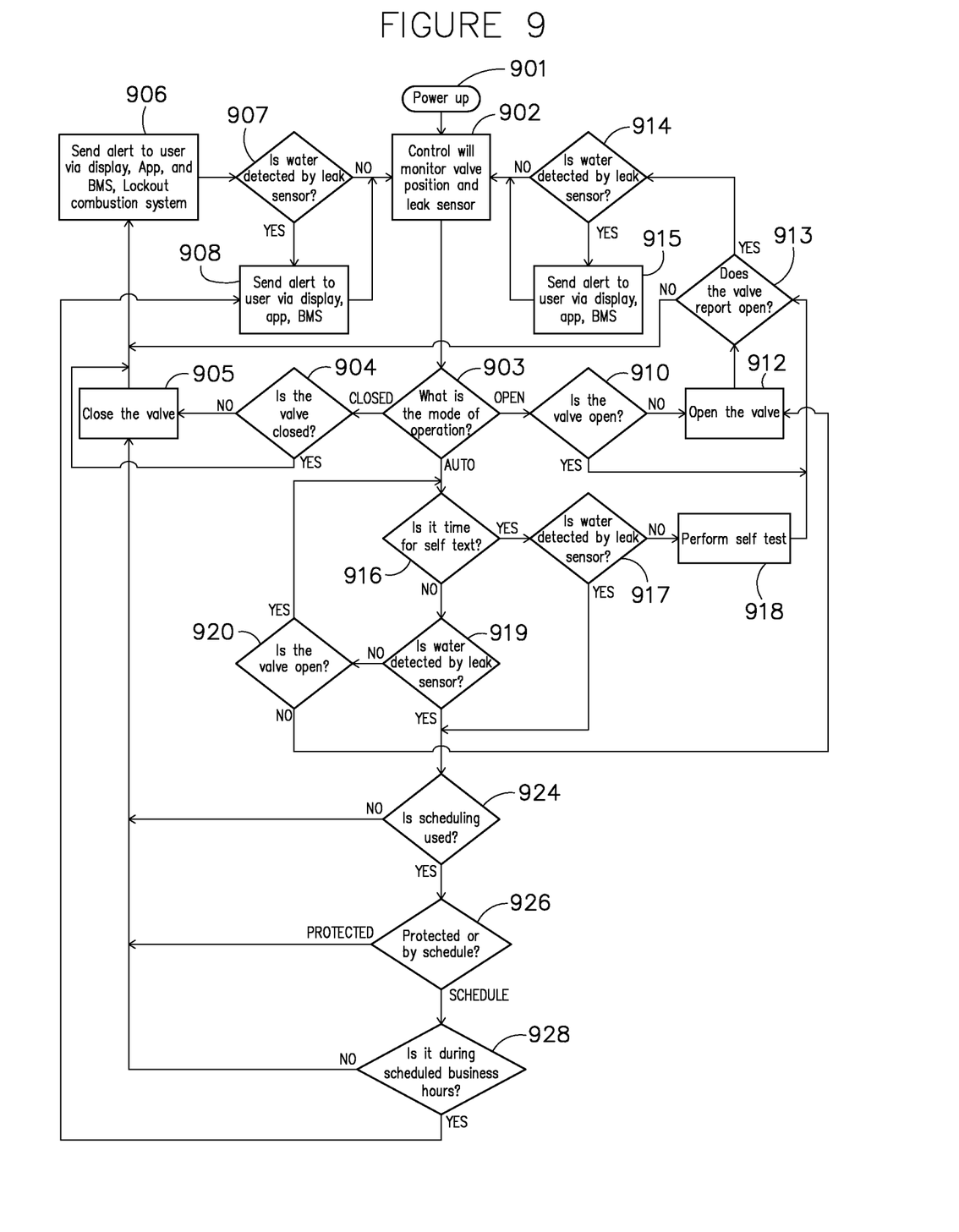
FIG. 9 is a flowchart that illustrates an example operation of a controller of the water heater, in accordance with example embodiments of the present disclosure.

Although specific operations are disclosed in the flowchart illustrated in FIG. 9, such operations are non-limiting examples. That is, embodiments of the present disclosure are well suited to performing various other operations or variations of the operations recited in the flowchart. It is appreciated that the operations in the flowchart illustrated in FIG.

9 may be performed in an order different than presented, and that not all of the operations in the flowchart may be performed.

All, or a portion of, the embodiments described by the flowchart illustrated in FIG. 9 can be implemented using computer-readable and computer-executable instructions which reside, for example, in a memory associated with the controller 109 or computer-usable media of a computer system or like device. As described above, certain processes and operations of the present disclosure are realized, in one embodiment, as a series of instructions (e.g., software programs) that reside within a memory associated with the controller 109 or a computer readable memory of a computer system and are executed by a circuit of the controller 109 or the processor of the computer system. When executed, the instructions cause the computer system or the controller 109 to implement the functionality of the present disclosure as described below.

When water leaks from the storage tank 101 and triggers the leak sensor 202, the leak sensor 202 may send a signal to a controller 109 of the water heater 100. The leak sensor 202 may be electrically coupled to the controller 109 of the water heater by plugging the connector 206 of the leak sensor 202 into a corresponding connector receptacle (not shown) of the water heater 100 that is connected to the controller 109. Upon receiving the signal from the leak sensor 202, the controller 109 may generate and transmit a notification alerting an end user regarding the leak. Responsively, the controller 109 may wait to receive an input from the end user or automatically control a shut off valve to interrupt water flow into the storage tank of the water heater.

The controller 109 may be disposed within the water heater as illustrated in FIG. 1 and may comprise input/output ports, one or more processors, a memory, and/or a communication interface for wireless and wired communication. Further, the shut-off valve 111 may be disposed at the inlet, e.g., cold water inlet, of the water heater as illustrated in FIG. 1.

Turning to FIG. 9, in operations 901-903, the controller 109 will monitor a leak sensor 202 and a valve position of a shut-off valve 111 of the water heater that is configured to control water flow (water that is to be heated, e.g., cold water) into a storage tank of the water heater. Further, the controller 109 determines a mode of operation of the shut-off valve 111 which can include a closed mode, an open mode, and an automatic mode. The automatic mode refers to a mode where the operation of the shut-off valve 111 is tied to the leak sensor 202 such that if a leak is detected, the shut-off valve 111 is closed, otherwise the shut-off valve 111 is open. In the open mode, the shut-off valve 111 is always open, while in the closed mode, the shut-off valve 111 is always closed. In some embodiments, the shut-off valve 111 may have an automatic when unoccupied mode of operation where the shut-off valve 111 is closed only if the leak is detected outside of a predetermined time period, e.g., business hours.

If the controller 109 determines that the shut-off valve 111 is operating in a closed mode but the shut-off valve 111 is in an open state, then the controller 109 proceeds to execute operations 904-908, where the shut-off valve 111 is closed and an alert indicating that the shut-off valve 111 has been closed is sent to a user. Alternatively, if the controller 109 determines that the shut-off valve 111 is closed, then an alert is sent to the user indicating the state of the shut-off valve 111 as being closed. Further, the controller 109 determines whether water is detected by the leak sensor 202. If water is detected by the leak sensor 202 (leak condition), the controller 109 sends an alert to a user indicating that a water leak has been detected. The alert may also prompt the user to provide a response indicating whether the controller 109 is to close the shut-off valve 111. Accordingly, the controller 109 may wait to receive an input from the user (either directly or via a computing device of the user) and controls the shut-off valve 111 based on the input received from the user.

If the controller 109 determines that the shut-off valve 111 is operating in the open mode but the shut-off valve 111 is in a closed state, then the controller 109 proceeds to execute operations 910-915, where the shut-off valve 111 is opened. Alternatively, if the controller 109 determines that the shut-off valve 111 is open, then an alert is sent to the user if the valve is not reporting that it is open despite being open. Further, the controller 109 determines whether water is detected by the leak sensor 202. If water is detected by the leak sensor 202 (leak condition), as in the case of the closed mode discussed above, the controller 109 sends an alert to a user indicating that a water leak has been detected. As discussed above, the alert prompts the user to provide a response indicating whether the controller 109 is to close the shut-off valve 111. Accordingly, the controller 109 waits to receive an input from the user and controls the shut-off valve 111 based on the input received from the user.

If the controller 109 determines that the shut-off valve 111 is operating in the automatic mode, then the controller 109 proceeds to execute operations 916-928, where the controller 109 performs a self-test when the controller 109 determines that it is time for a self-test of the shut-off valve 111 and that water is not detected by the leak sensor. Self-test refers to a process where periodically (every day, week, month, etc.) the controller 109 closes the shut-off valve 111 and waits for a verification signal to make sure the controller 109 can close the shut-off valve 111. If the controller 109 doesn't receive the verification signal, the controller 109 sends an alarm. Further, once the shut-off valve 111 is closed, the controller 109 opens it again and waits for the verification signal to make sure the shut-off valve 111 is fully open. If the controller 109 cannot verify that the shut-off valve 111 is fully open, the controller 109 sends an alarm.

If the leak sensor detects water, then, the controller 109 determines whether the shut-off valve 111 is to be controlled based on a schedule. If not, the controller 109 closes the shut-off valve 111 upon determining that the leak sensor has detected water. However, if the shut-off valve 111 is to be controlled based on a schedule, the controller 109 determines whether a time at which the leak sensor detected the water and reported to the controller 109 (via a signal) is within a scheduled timeframe. The timeframe may be scheduled based on business hours or may be selected by the user. If the time at which the leak sensor detected the water and reported to the controller 109 (via a signal) is outside of a scheduled timeframe (first mode of operation), then, the controller 109 automatically closes the shut-off valve 111. However, if the time at which the leak sensor detected the water and reported to the controller 109 (via a signal) is within a scheduled timeframe (second mode of operation), then, the controller 109 sends an alert (notification) to the user and waits for an input from the user to control the shut-off valve 111 based on the received user input. In some embodiments, if the user input is not received within a predetermined time period, the controller 109 may automatically close the shut-off valve 111 (override mode).

In one or more example embodiments, the alert can be transmitted to the user's mobile computing device or a desktop via a wireless or a wired network to which the controller 109 may be communicatively coupled. That is the controller 109 may have wireless and/or wired network interfaces. The alert may also be transmitted to a building management system (BMS) to which a user has access. Further, a response from the user, i.e., the user input may be transmitted back to the controller 109 from a computing device via a wireless or a wired network.

In some embodiments, the shut-off valve 111 described herein can work as an isolation valve independent of the leak sensor operation. Further, as discussed above, the shut-off valve 111 can be configured to operate differently within operating hours of a business or within a certain timeframe selected by the user, e.g., (a) within operating hours, the shut off valve may not close in response to a leak, and (b) outside operating hours, the shut off valve may close in response to leak. The controller 109 control the shut-off valve 111. Furthermore, as discussed above, the controller 109 can send a message to user's cell phone asking whether the shut off valve needs to be closed and act according to the user's response.

Turning to FIGS. 3-4, the leak sensors 202 may be disposed in the insulation cavity 103, but away from the surface of the storage tank 101. In one example, as illustrated in FIG. 3, the leak sensors 202 may be disposed proximate to or on an interior surface of the outer jacket 102. In said example, the leak sensor assembly 108 may include the leak sensor 202 and a transport element 302 that is coupled to the leak sensor 202. The transport element 302 may be formed using a material that can transport water or any appropriate liquid from a source point, i.e., point at which the water engages the transport element, to a destination point, e.g., point where the leak sensor 202 is coupled to the transport element.

Figure 5:
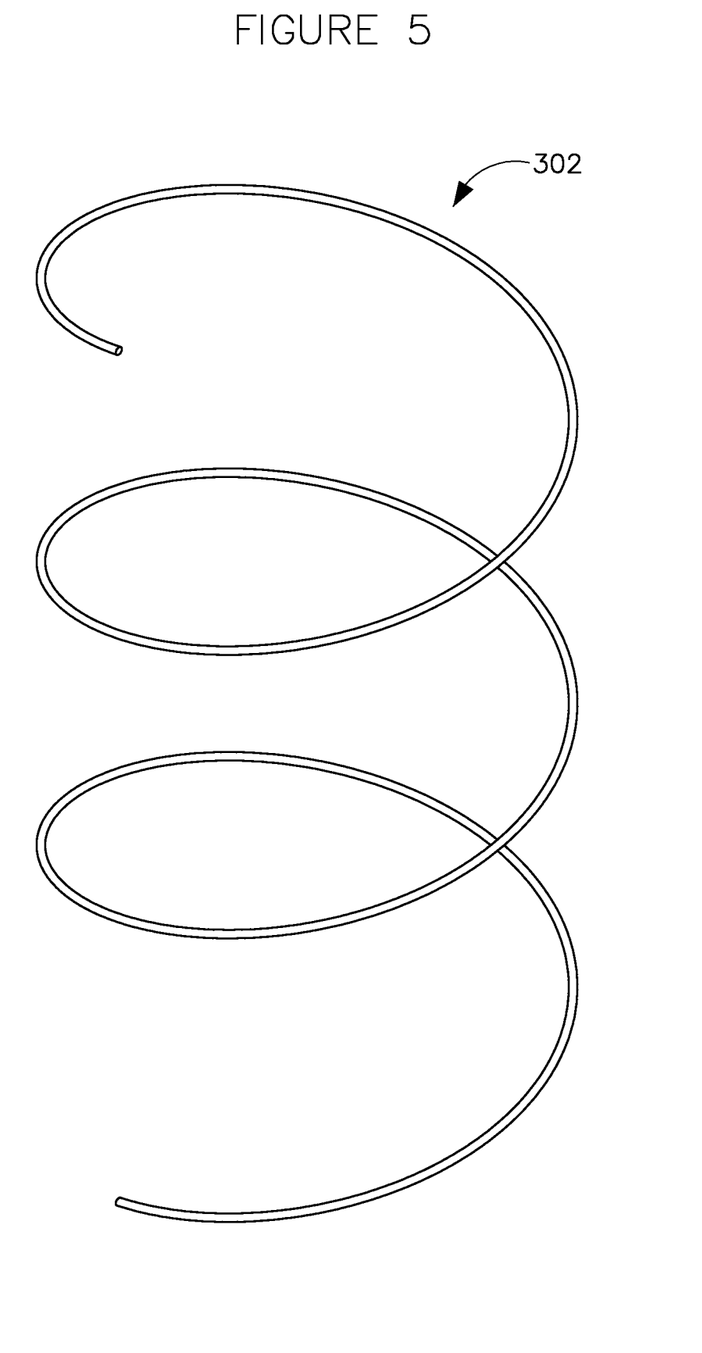
FIG. 5 illustrates a wicking tube of the second example leak detection assembly that is helically wound, in accordance with example embodiments of the present disclosure.

In the example embodiment illustrated in FIGS. 3 and 5, the transport element 302 may include a tube that is formed using a wicking material that can transport the leaked water from the surface of the storage tank 101 towards the leak sensor 202. Hereinafter the transport element 302 may be referred to as a wicking tube 302. However, in other example embodiments, the transport member may have any other shape or may be made using any other appropriate material that transports water by capillary action or by the aid of gravity. In particular, as illustrated in FIG. 5, the wicking tube 302 may be helically wrapped around the storage tank 101 of the water heater to create the circumferential area of leak detection around the storage tank 101. However, in other example embodiment, the wicking tube 302 may be wrapped around the storage tank 101 in any other appropriate manner that creates a circumferential area of leak detection around the storage tank 101. The water that leaks from the storage tank 101 may reach the wicking tube 302 that is wrapped around the storage tank 101. The water that reaches the wicking tube 302 may be transported by the wicking tube 302 to the leak sensor 202 that is disposed away from the storage tank 101 of the water heater 100 and coupled to the wicking tube 302.

In some example embodiments where the leak sensor assembly 108 includes the wicking tube 302, the leak sensor 202 that is coupled to the wicking tube 302 may not be disposed in the insulation cavity 103 between the storage tank 101 and the outer jacket 102. Instead, the wicking tube 302 that is wrapped around the storage tank 101 may be drawn out towards the location where the leak sensor 202 is disposed. In said some example embodiments, the leak sensor 202 may be disposed at any other appropriate location, e.g., external to the water heater 100, the exterior surface of the outer jacket 202, in the bottom pan or drain pan of the water heater 100, etc.

In another example embodiment, the leak sensor assembly 108 may not include the wicking tube 302. Instead, the leak sensor 202 may include a rope sensor that is long enough to be helically wrapped (or wrapped in any other manner) around the storage tank 101 of the water heater 100 without departing from a broader scope of the present disclosure.

In yet another example embodiment, as illustrated in FIG. 4, the leak sensor 202 may be disposed in close proximity to electrical wiring 402 that runs through an insulation material disposed in the insulation cavity 103 between the outer jacket 102 and the storage tank 101. Placing the leak sensor 202 in close proximity to the electrical wiring 402 in the insulation cavity 103 as described above increases the likelihood that the leak sensor 202 will come in contact with the water that leaks from the storage tank 101 because the water may take the path of least resistance offered by the electrical wiring 402. Instead of placing the leak sensor 202 in close proximity to the electrical wiring, in some examples, the leak sensor 202 may be placed in proximity to any other appropriate path of least resistance that the leaked water may follow. In said examples where the leak sensor 202 is placed in close proximity to a path of least resistance (e.g., electrical wiring 402), the leak sensor assembly 108 may or may not include the wicking tube 302 that transports the water from the surface of the storage tank 101 to the leak sensor 202.

Figure 6:
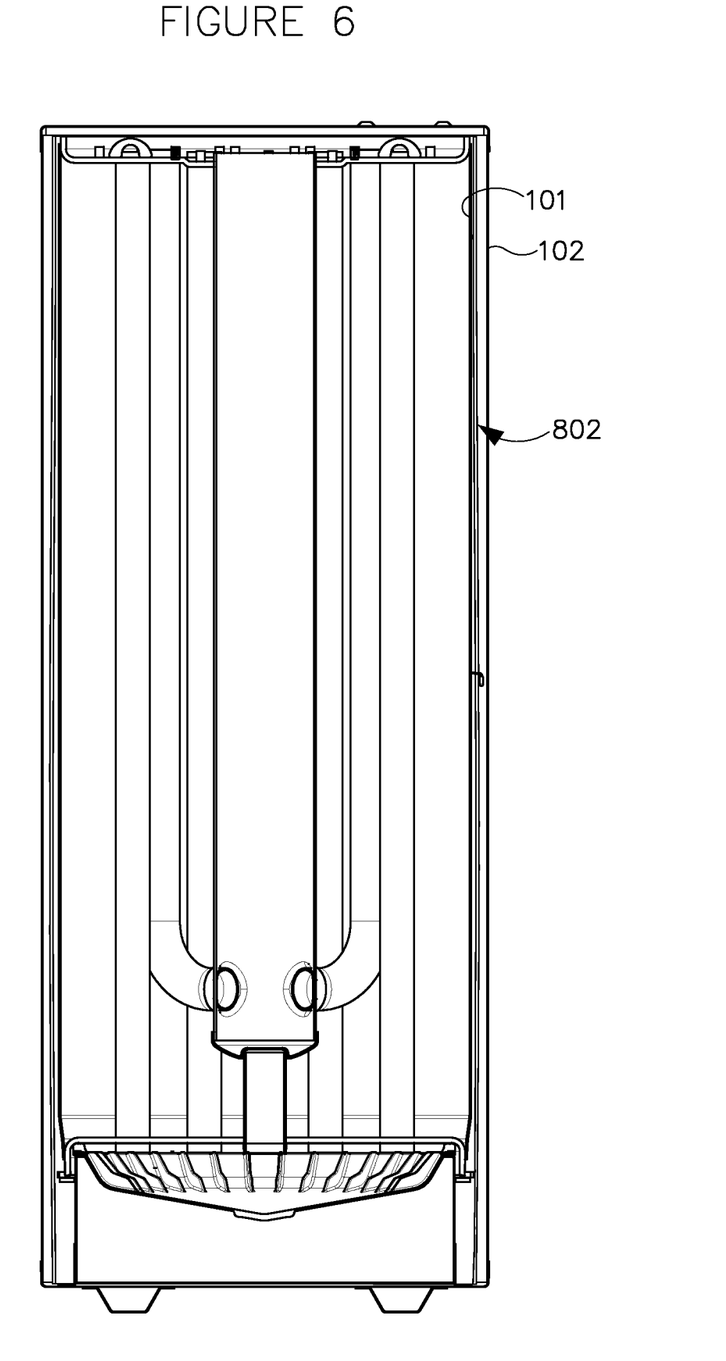
FIG. 6 illustrates a cross-section view of the water heater with a barrier disposed in the insulation cavity and wrapped around the inner storage tank of the water heater, in accordance with example embodiments of the present disclosure.
Figure 7:
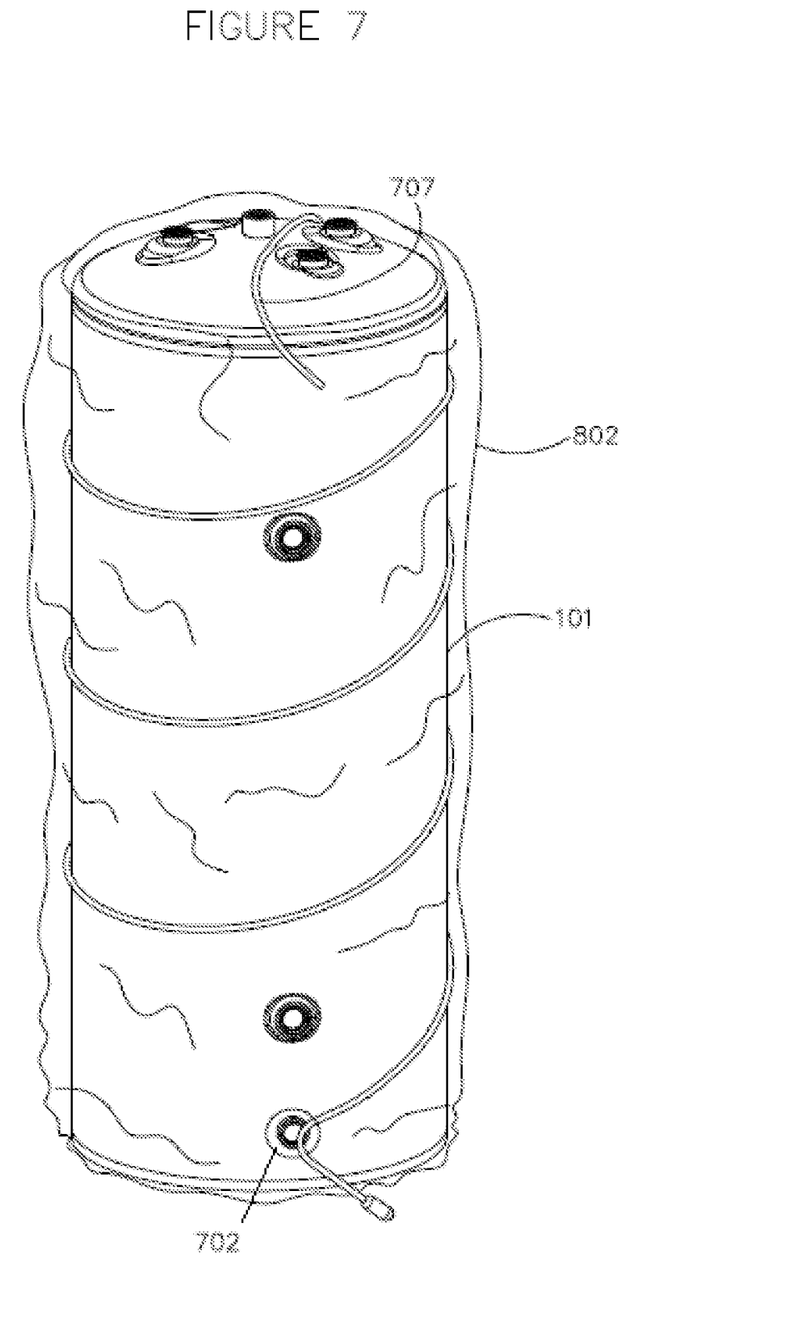
FIG. 7 illustrates a perspective view of the inner storage tank with the barrier disposed thereon, in accordance with example embodiments of the present disclosure.
Figure 8:
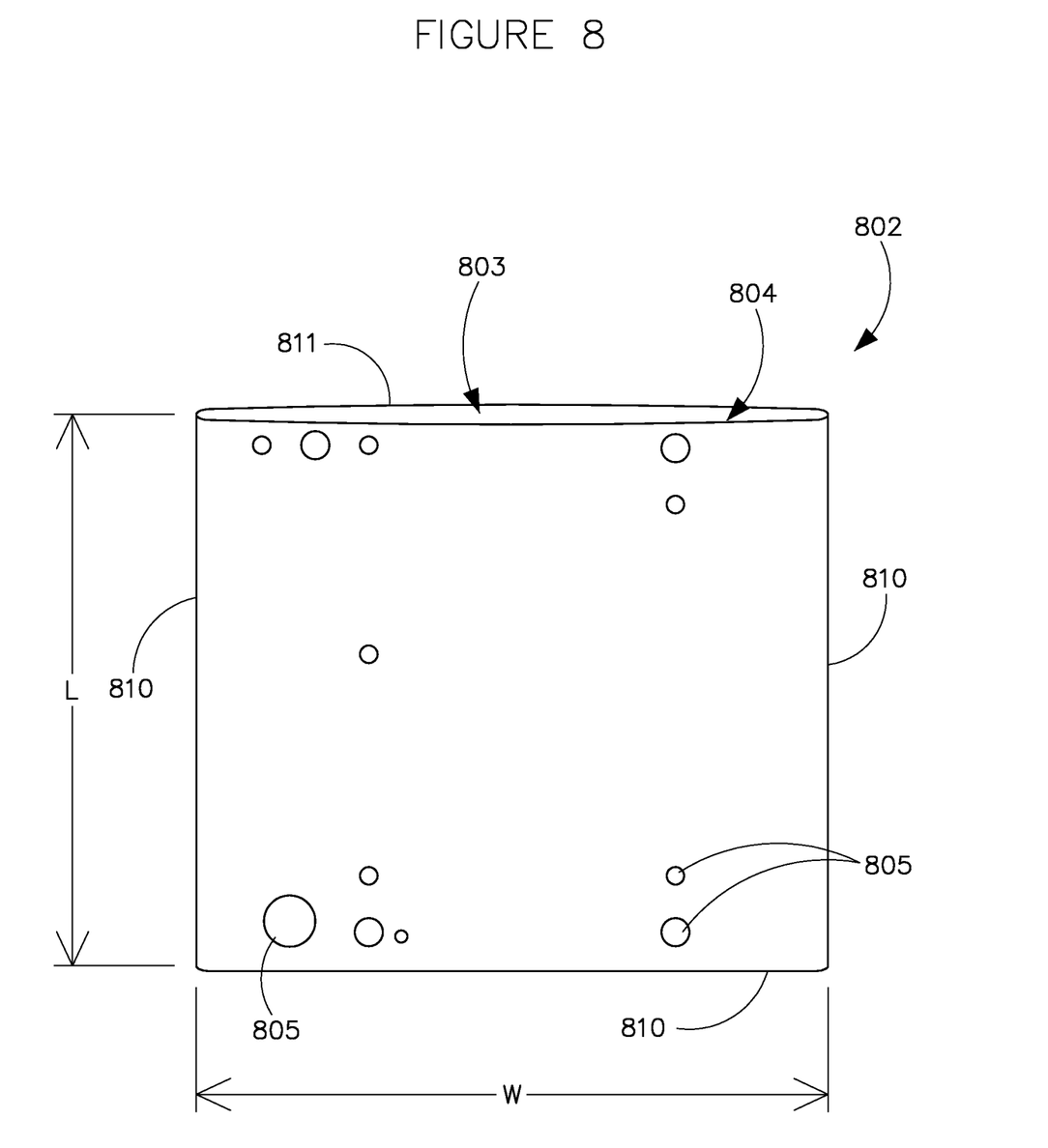
FIG. 8 illustrates an example barrier, in accordance with example embodiments of the present disclosure.

Turning now to FIGS. 6-8, the water heater 100 additionally includes a barrier 602 that is disposed in the insulation cavity 103 between the storage tank 101 and the outer jacket 102. The barrier 602 is configured to channel the water that leaks from the storage tank 101 to the leak sensor 202 and/or the wicking tube 302 that is coupled to the leak sensor 202 disposed away from the storage tank 101. Further, the barrier 602 prevents the water that leaks from the storage tank 101 from flowing into the insulation material that is disposed in the insulation cavity 103. Without the barrier 602, water that leaks from the storage tank 101 may flow into the insulation material which may direct the water away from leak sensors 202 and/or the wicking material 302, thereby negatively affecting the leak detection capability of the water heater 100.

As illustrated in FIG. 8, the barrier 602 may include an insulation bag 802 that is substantially rectangular in shape. The insulation bag 802 may include two substantially rectangular layers made of non-permeable material, such as, polyurethane or similar material that are sealed to each other along the perimeter 810 or edges except for the opening (803, 804) along the top edge 811 for foaming and ventilation. The foaming opening 803 and the ventilation opening 804 are configured to allow the insulation material to flow into the insulation bag 802 and the ventilation opening 804 is configured to allow the air that is displaced by the insulation material in the insulation bag 802 to escape. The insulation material is disposed in between the two layers of the insulation bag 802. As the insulation material fills the insulation bag 802, one layer of the insulation bag 802 expands toward and pushes against the storage tank 101 of the water heater 100 while the opposite layer of the insulation bag 802 expands toward and pushes against the outer jacket 102 of the water heater 100.

Even though FIG. 8 illustrates the foaming and ventilation openings (803, 804) are formed in the top edge of insulation bag 802, one of skill in the art can understand and appreciate that in other example embodiments, the foaming and ventilation openings (803, 804) may be formed along any other edge or surface of the insulation bag 802 without departing from a broader scope of the present disclosure. For example, in some embodiments, the foaming and ventilation openings (803, 804) may be formed along the side edges 810 of the insulation bag 802.

As illustrated in FIGS. 6-8, the insulation bag 802 is configured to be wrapped around the storage tank 101 such that the opposite ends of the insulation bag 802 overlap. In particular, an adhesive may be applied at the overlapping region to secure the insulation bag 802 against the storage tank 101 of the water heater 100. The insulation bag 802 is configured to be wrapped around the storage tank 101 for easy installation. Accordingly, the length 'l' of the rectangular shaped insulation bag 802 may be substantially similar to the height of the storage tank 101, while the width 'w' of the insulation bag 802 may be slightly longer than the circumference of the storage tank 101 to allow the edges to overlap when the insulation bag 802 is wrapped around the storage tank 101.

Once the insulation bag 802 is disposed around the storage tank 101 and the insulation bag 802 is filled with insulating material, the interface between the external surface of the storage tank 101 and the layer of the insulation bag 802 that is pushed against the storage tank 101 forms a channel that directs water leaking from the storage tank 101 either vertically or radially towards the leak sensors 202. The leak sensors 202 may be placed on the external surface of the storage tank 101 as described above or on the layer of the insulation bag 802 that faces the storage tank 101. In other words, any water that leaks from the storage tank 101 becomes trapped against the external surface of the storage tank 101, and the water is directed either vertically or radially along the channel formed by the interface between insulation bag 802 and the storage tank 101 towards the leak sensors 202 disposed on the storage tank 101 or the insulation bag 802. In addition to channeling the water towards the leak sensors 202, the insulation bag 802 prevents water from flowing into the insulation material.

In addition to the foaming and ventilating openings (803, 804) that are formed along the top edge 811 of the insulation bag 802, the insulation bag 802 may include apertures 805 that have been formed in the insulation bag 802 to allow couplings 702 of the water heater 100 to extend through. Further, the apertures 805 may be formed to allow the wicking tube 302 to pass through to the insulation bag 802 when the leak sensor 202 is disposed away from the storage tank 101 in some embodiments, or for exit of the leak sensor wiring 704. The insulation bag 802 is sealed along the perimeter of the apertures 805 and the apertures 805 may be undersized compared to the couplings 702, the wicking tube 302, or sensor wirings 704 passing therethough such that the insulation bag 802 remains secured to the storage tank 101 for installation of the outer jacket 102.

Even though the present disclosure describes an insulation bag 802 having two layers that are sealed along the edges, one of ordinary skill in the art can understand and appreciate that in other example embodiments, the insulation bag may include only one layer that is wrapped around the storage tank of the water heater without departing from a broader scope of the present disclosure. In said example embodiments where the insulation bag has only one layer, the insulation material may be disposed between one surface of the one layer and the outer jacket 102, while the opposite surface of the one layer forms a channel with the external surface of the storage tank 101 to direct water that leaks from the storage tank 101 towards the leak sensor 202. The single layer of the insulation bag may also prevent the water from flowing to the insulating material disposed in the insulating cavity between the insulation bag and the outer jacket 102.

It is noted that the water heater may use any one of the example leak sensor assemblies described above to detect a water leak condition. Furthermore, in one or more example embodiments, the leak sensor assembly may be factory installed during a manufacturing process of the water heater. However, in other example embodiments, the leak sensor assembly may be configured for installation on site.

Although example embodiments are described herein, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A water heater comprising:
   an inner storage tank that is configured to store liquid that is to be heated;
   an outer jacket that is disposed around and spaced apart from the inner storage tank such that the outer jacket and the inner storage tank define an annular insulation space therebetween;
   a leak detection system that is disposed in the annular insulation space to detect the liquid that leaks from the inner storage tank, the leak detection system comprising:
      a first leak sensor assembly that is disposed on an outer surface of a sidewall of the inner storage tank and adjacent to a top end of the inner storage tank,
      a second leak sensor assembly that is disposed on the outer surface of the sidewall of the inner storage tank and adjacent to a bottom end of the inner storage tank,
      a third leak sensor assembly that is disposed on the outer surface of the sidewall of the inner storage tank and between the top end and the bottom end of the storage tank,
         wherein each of the first leak sensor assembly, the second leak sensor assembly, and the third leak sensor assembly comprise a wicking tube that circumferentially extends around the sidewall of the storage tank and a leak sensor that is coupled to the wicking tube; and
   a barrier that is disposed in the annular insulation space, the barrier comprising an insulation bag that is wrapped around the storage tank such that one edge of the insulation bag overlaps over the opposite edge and at least the wicking tube of each of the first leak sensor assembly, the second leak sensor assembly, and the third leak sensor assembly is disposed between the insulation bag and the outer surface of the sidewall of the inner storage tank,
   wherein the insulation bag (i) prevents the liquid that leaks from the inner storage tank from flowing through an insulation material that is disposed in the annular insulation space, and (ii) directs the liquid that leaks from the inner storage tank towards at least one of the first leak sensor assembly, second leak sensor assembly, and the third leak sensor assembly through channels that are formed between the insulation bag and the outer surface of the sidewall of the inner storage tank.

2. The water heater of claim 1, wherein the wicking tube is configured to transport the liquid that leaks from the inner storage tank to the leak detection system.

3. The water heater of claim 1, wherein each of the first leak sensor assembly, the second leak sensor assembly, and the third leak sensor assembly forms a circumferential area of leak detection around the inner storage tank.

4. The water heater of claim 2, wherein the leak detection system is disposed away from the storage tank and the wicking tube is coupled to the leak sensor.

5. The water heater of claim 1, wherein the leak detection system is disposed proximate to a path of least resistance of the liquid that leaks from the storage tank.

6. The water heater of claim 1, wherein the insulation bag comprises two layers of non-permeable material that are substantially rectangular in shape and sealed together at the edges except the top edge, and wherein the top edge comprises a form opening for inlet of the insulation material and a ventilation opening for exiting air that is displaced by the insulation material in the insulation bag.

7. The water heater of claim 6:
wherein the insulation material is disposed in the insulation bag between the two layers,
wherein when the insulation material is disposed in the insulation bag, a first layer expands towards the inner storage tank and an opposite second layer expands towards the outer protective jacket, and
wherein the interface between the first layer of the insulation bag and the storage tank forms the channel that directs the liquid that leaks from the storage tank towards at least one of the first leak sensor assembly, the second leak sensor assembly, and the third leak sensor assembly.

8. A water heater comprising:
an inner storage tank that is configured to store water that is to be heated;
an outer jacket that is disposed around and spaced apart from the inner storage tank such that the outer jacket and the inner storage tank define an insulation space therebetween;
a leak sensor assembly that is disposed in the insulation space to detect water that leaks from the inner storage tank, wherein the leak sensor assembly comprises:
a leak sensor; and
a wicking tube that is formed of a wicking material and configured to transport the water towards the leak sensor,
wherein the wicking tube is helically wrapped around the storage tank and coupled to the leak sensor, and
wherein the wicking tube and leak sensor operate in concert to form a circumferential area of leak detection around the storage tank;
a shut-off valve; and
a controller that is coupled to the leak sensor assembly and the shut-off valve, the controller being configured to:
determine whether a leak from the inner storage tank has been detected based on an input received from the leak sensor assembly;
responsive to positive determination that the leak has been detected, determine that a time when the leak is detected is within a scheduled timeframe;
responsive to the positive determination that the leak has been detected and a positive determination that the time when the leak is detected is within the scheduled timeframe, transmit an alert to a user and control the shut-off valve based on an input received from the user; and
responsive to the positive determination that the leak has been detected and a negative determination that the time when the leak is detected is within the scheduled timeframe, close the shut-off valve.

9. The water heater of claim 8 further comprising: a barrier that is disposed in the insulation space to direct the water towards the wicking material while preventing the water from flowing through an insulation material that is disposed in the annular insulation space.

10. The water heater of claim 8, wherein the leak sensor is a rope sensor.

11. The water heater of claim 9, wherein the barrier comprises an insulation bag, and wherein the insulation bag is wrapped around the storage tank.

12. The water heater of claim 11, wherein the insulation bag comprises two layers of polyurethane that are substantially rectangular in shape and sealed together at the edges except a top edge, and wherein the top edge comprises a form opening for inlet of the insulation material and a ventilation opening for exiting air that is displaced by the insulation material in the insulation bag.

13. The water heater of claim 12:
wherein the insulation material is disposed in the insulation bag between the two layers,
wherein when the insulation material is disposed in the insulation bag, a first layer expands towards the inner storage tank and an opposite second layer expands towards the outer protective jacket.

14. The water heater of claim 12,
wherein an interface between the first layer of the insulation bag and the storage tank forms a channel that directs the water that leaks from the storage tank towards the wicking tube.

15. A water heater comprising:
an inner storage tank that is configured to store liquid that is to be heated;
an outer jacket that is disposed around and spaced apart from the inner storage tank such that the outer jacket and the inner storage tank define an insulation space therebetween; and
a leak sensor assembly that is disposed in the insulation space to detect the liquid that leaks from the inner storage tank, wherein the leak sensor assembly comprises a plurality of leak sensors that are disposed on the storage tank;
wherein the plurality of leak sensors operate in concert to form a circumferential area of leak detection around the storage tank;
a barrier that is disposed in the insulation space to direct the liquid that leaks from the storage tank towards the leak sensor assembly while preventing the water from flowing through an insulation material that is disposed in the insulation space;
a shut-off valve; and
a controller that is coupled to the leak sensor assembly and the shut-off valve, the controller being configured to:
determine whether a leak from the inner storage tank has been detected based on an input received from the leak sensor assembly;

responsive to positive determination that the leak has been detected, determine that a time when the leak is detected is within a scheduled timeframe;

responsive to the positive determination that the leak has been detected and a positive determination that the time when the leak is detected is within the scheduled timeframe, transmit an alert to a user and control the shut-off valve based on an input received from the user; and responsive to the positive determination that the leak has been detected and a negative determination that the time when the leak is detected is within the scheduled timeframe, close the shut-off valve.

16. The water heater of claim 15:

wherein the plurality of leak sensors comprise:
   a first leak sensor that is disposed on and adjacent to a top end of the storage tank,
   a second leak sensor that is disposed on and adjacent to a bottom end of the storage tank, and
   a third leak sensor that is disposed on and in between the top end and the bottom end of the storage tank, and wherein the first leak sensor, second leak sensor, and third leak sensor comprise a rope sensor.

17. The water heater of claim 16, wherein the barrier comprises an insulation bag, and wherein the insulation bag is wrapped around the storage tank such that the first leak sensor, the second leak sensor, and the third leak sensor are disposed between the insulation bag and the storage tank, and wherein an interface between the insulation bag and the storage tank forms a channel that directs the liquid that leaks from the inner storage tank towards at least one of the first leak sensor, the second leak sensor, and the third leak sensor.

* * * * *